Jan. 9, 1968     C. L. E. MARCHERON     3,362,757
COMPUTER CONTROLLED WHEEL BRAKING SYSTEM
Filed Sept. 24, 1964     7 Sheets-Sheet 1

INVENTOR
CLAUDE L. MARCHERON
ATTORNEYS

Jan. 9, 1968  C. L. E. MARCHERON  3,362,757
COMPUTER CONTROLLED WHEEL BRAKING SYSTEM
Filed Sept. 24, 1964  7 Sheets-Sheet 7

INVENTOR
CLAUDE L. MARCHERON
BY
ATTORNEYS

United States Patent Office 3,362,757
Patented Jan. 9, 1968

3,362,757
COMPUTER CONTROLLED WHEEL BRAKING SYSTEM
Claude Louis Edouard Marcheron, Montrouge, France, assignor to Societe d'Exploitation des Materiels Hispano-Suiza, Bois-Colombes, Hauts-de-Seine, France, a society of France
Filed Sept. 24, 1964, Ser. No. 398,923
Claims priority, application France, Sept. 30, 1963, 978,456; June 16, 1964, 949,125
30 Claims. (Cl. 303—21)

This invention relates to the field of vehicle braking systems and particularly to automatically controlled systems of this type.

The present invention is directed towards servo-controlled braking systems either for vehicles which maintain a permanent contact with the ground (land vehicles), or for those which are only temporarily in contact therewith (aircraft), such systems including, in a general manner, braking devices comprising at least one servo-control of any type appropriately arranged so as to be able to cause the application of a regulatable braking force to at least one wheel of the vehicle. The present description is more particularly directed towards devices of this type adapted for effecting the braking of aircraft. However, this is only for purposes of description and because such application appears to have the greatest interest at this time, and it should be appreciated that the present invention could be used equally well to control the braking of any other type of vehicle.

It is one object of this invention to optimize the braking of vehicles.

It is another object of this invention to reduce to a minimum the wear experienced by braking surfaces.

Yet another object of this invention is to increase the safety of aircraft landings.

A further object of this invention is to remove the possibility of human error during the application of aircraft wheel brakes.

Still another object herein is to reduce the aircraft landing distance to a minimum.

An auxiliary object herein is to measure the vehicle ground speed with the aid of relatively simple means.

The preferred embodiments of the present invention comprise, principally, in combination with at least one servo-control of any suitable type arranged so as to be able to cause the application of a regulatable braking torque to at least one wheel of the vehicle, said servo-control being in turn controlled by an electronic device into which are introduced certain parameters related to the movement of said vehicle, means added to said electronic device to cause the latter to produce a continuous variation which tends to cause the instantaneous slippage of the wheel to approach an optimal value; said means comprising:

On the one hand, an electronic computer arranged so as to be able, at each instant and regardless of the condition of the runway, starting from the values of the vehicle's ground speed, the braking torque exerted on the wheel, and the instantaneous angular velocity of the wheel (these three quantities being measured by any appropriate means), to calculate on the basis of the latter two of the above-noted quantities the drag force exerted on said wheel, to calculate the instantaneous slippage of said wheel, to determine the signs of the respective time-derivatives of the instantaneous slippage and of the drag force calculated as indicated above, to compare said signs, to translate the result of this comparison into a characteristic binary signal, and, finally, to use the characteristic binary signal, and, finally, to use the characteristics of this signal, including its duration, which is variable, in order to develop, by a continuous variation, another signal, called "an assigned slippage," which represents an optimum slippage which is best adapted to the conditions existing at the instant considered, this assigned slippage corresponding to a particular optimum angular velocity of the wheel, which velocity is called "the assigned angular velocity"; and On the other hand, a regulator receiving, among other indications, said assigned angular velocity and the instantaneous angular velocity of the wheel and acting on said braking servo-control in such a way as to maintain the instantaneous angular velocity of said wheel at the evolved "assigned value" developed in said computer.

This invention also involves certain other arrangements which are preferably used at the same time as the above noted structure, but which may be used by themselves, and which will be described in greater detail below, particularly in a second embodiment comprising, at the same time as causing vehicles of the type in question to carry at least one servo-control of any suitable type arranged so as to be able to cause the application of a regulatable braking torque to at least one wheel of the vehicle, said servo-control being in turn controlled by an electronic device designed to develop a regulating pattern starting from data including, in particular, an indication relating to the true ground speed of the vehicle, means for determining the vehicle's true ground speed, said means comprising:

On the one hand, an accelerometer, preferably of the inertial type, mounted on the vehicle and arranged to measure its longitudinal accelerations; and On the other hand, an integrating cell receiving both the signal supplied by said accelerometer and a reference signal whose characteristics represent the initial condition of vehicle speed, this reference signal being advantageously generated by a tachometer generator mounted on the wheel to be braked.

These and other objects, characteristics and advantages of the present invention will become more readily understood from the following detailed description of several non-limitative embodiments of the present invention when taken together with the attached drawings, in which.

Figure 1:
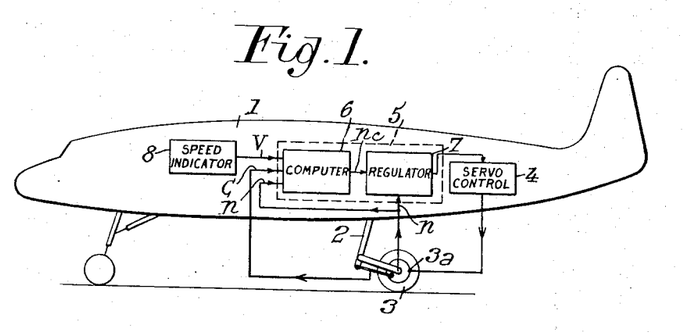
FIG. 1 is a block diagram of a complete automatic braking system according to the present invention.

One form which the present invention may take is shown in FIG. 1 as being housed within an aircraft equipped with a main landing gear 2 on which is mounted at least one wheel 3 furnished with brakes 3a which will be operated by a servo-control which is preferably, but not necessarily, of the hydraulic type.

Before proceeding with a discussion of the structure shown by the drawings certain considerations should be mentioned.

It is known that the efficacity of a wheel brake, particularly in terms of the braking torque C which can be developed, is often superior to that required under certain minimal load conditions (when the aircraft is empty for example) or certain ground surface conditions (when the runway is wet, for example), with the result that it is necessary to be able, at each instant, to adapt torque C to the then existing conditions.

However, the manual brake control systems currently available are incapable of obtaining an optimum braking control. Most of the automatic systems previously proposed have the same shortcoming, these systems being principally concerned with preventing the wheels from being blocked, to avoid skidding, but not being capable of obtaining an optimum braking action.

In this condition it may be noted that a braking regulator should in order to achieve its full effectiveness, be able to adapt, at each instant and in an automatic manner, the braking torque to be exerted C to the maximum possible drag force F, this force being equal to the product of the coefficient of friction $k$ between the tire and the ground and of the vertical load exerted on the wheel to which said tire is attached.

The natures of these two parameters will now be examined in detail.

In so far as concerns, first of all, the friction between the wheel and the ground, it is known that the coefficient of friction $k$ depends on the relative speed between the two, this relative speed being dependent on two factors: the true ground speed V of the aircraft and the slippage $g$ of the wheel, this slippage being defined at each instant by the relation $$g = \frac{V - nR}{V}$$

where $n$ is the speed of revolution of the wheel in radians/sec. and R is the wheel radius in units consistent with those used for V (preferably meters for R and meters/sec. for V, respectively).

Figure 2:
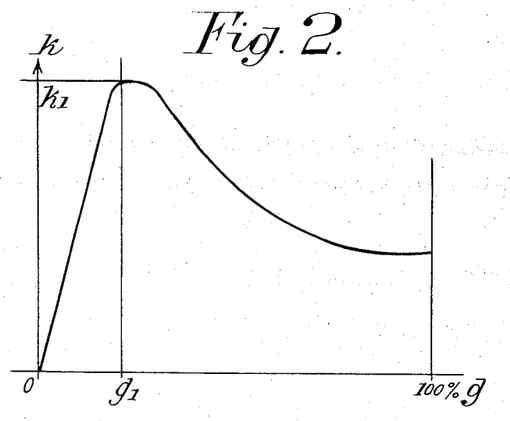
FIGS. 2 and 3 are graphs showing several relations involved in the operation of the systems of the present invention.

The variation of the coefficient of friction $k$ as a function of $g$ shows, as may be seen from FIG. 2, that $k$ passes through a maximum $k_1$ at a slippage value $g_1$ generally ranging between 5 and 20 percent slippage for a typical given value of V.

Figure 3:
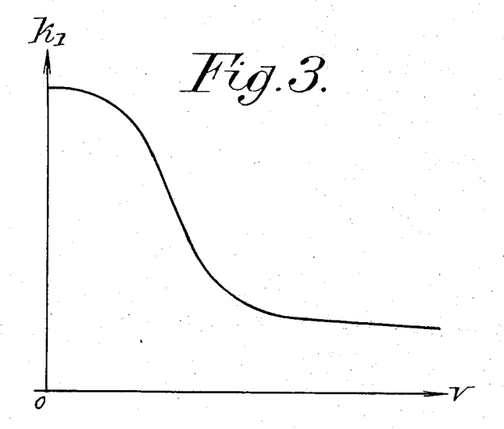

If the variations of this maximum of the coefficient of friction $k$ are plotted as a function of the aircraft speed V, it appears, as shown in FIG. 3, that $k_1$ decreases rapidly as speed V increases until $k_1$ reaches a relatively low value, after which it remains relatively constant for further increases in speed.

It should be appreciated that these two curves correspond only to the case of a surface whose characteristics remain constant over the entire path of travel of the aircraft. Such a condition is evidently not always fulfilled, the nature of the surface of a runway often varying due to many factors such as variations in the quality of surfacing of the runway from one point to another or the presence of areas of water, snow, ice or oil on the runway. It thus results that in reality there exists a whole family of curves similar to those of FIGS. 2 and 3.

In so far as concerns the vertical load P exerted on the wheel in question, its average value is known for a given type of aircraft, but it nevertheless remains that the variations of P around its average value may be relatively large and that the causes of these variations, which can be foreseen in some cases (variations in the lift of the aircraft as a function or speed), cannot be foreseen in many other cases (e.g. due to unevenness in the runway surface) to such an extent that it is extremely difficult to know the actual value of P at each moment.

If, taking the above-discussed factors into consideration, one considers a short period of time during which there is applied to the wheel a braking torque C superior to that called for by the value F of the drag force exerted on the wheel by the ground (the values of P and V being assumed to be constant for the short period of time here under consideration), the torque due to the drag force F increases progressively and the slippage $g$ of the wheel also increases until, reaching the value corresponding to the maximum value $k_1$ of the coefficient of friction $k$.

After reaching this value, further increases in the slippage (the rate of rotation $n$ of the wheel decreases) are accompanied by decreases in the drag force F.

If no exterior influence intervenes, this process will continue until the wheel becomes blocked ($n=0$).

Although the vertical load P on the wheel in question might vary from instant to instant, it is obvious that the drag force F will always be at its maximum possible value if the coefficient of friction $k$ between the wheel and the ground is at its $k_1$ value. Therefore, it may be considered that F follows the same curve with respect to $g$ as does $k$, for any value of F.

Considering then that the ordinates of FIG. 2 are proportional to the values of the drag force F, it will be seen that when the slippage is between O and $g$, (FIG. 2) any change in slippage will be accomplished by a change of F in the same sense; i.e. the time derivative of $g$ will have the same sign as that of F. This region of the curve corresponds to conditions under which it is desired to operate. Conversely, when the system is operating under conditions such that, in FIG. 2 $g$ is between $g$ and 100% corresponding to the case where C is too great, any increase in the slippage $g$ will be accompanied by a decrease in the drag force F, and vice versa. Therefore, the sign of the time derivative of $g$ will, in this case, be opposed to that of the time derivative of F. It may thus be said that when $dg/dt$ has the same sign as $dF/dt$, C must be increased, whereas when these derivatives have opposed signs, C must be decreased.

It will be appreciated that, under these conditions, a correct braking control requires a knowledge, at each instant, of the true ground speed V of the aircraft, of the speed of revolution $n$ of the wheel being braked, and of the braking torque C applied to said wheel, the specific use made of these quantities being described in detail below.

Returning now to FIG. 1, the hydraulic braking servo-control 4 is arranged in such a manner as to be able to cause the application of a regulatable braking torque C to at least one wheel of the landing gear and this servo-control 4 is controlled by an electronic system 5 into which are introduced signals representing, among other quantities, the discussed above parameters. The electronic system, as shown in greater detail in FIG. 4, contains means which are intended to cause the slippage $g$ of wheel 3 to tend toward an optimal value such that $k$ will be near its maximum value. This system 5 comprises, essentially, an analog aircraft landing computer 6 and a regulator 7.

Figure 4:
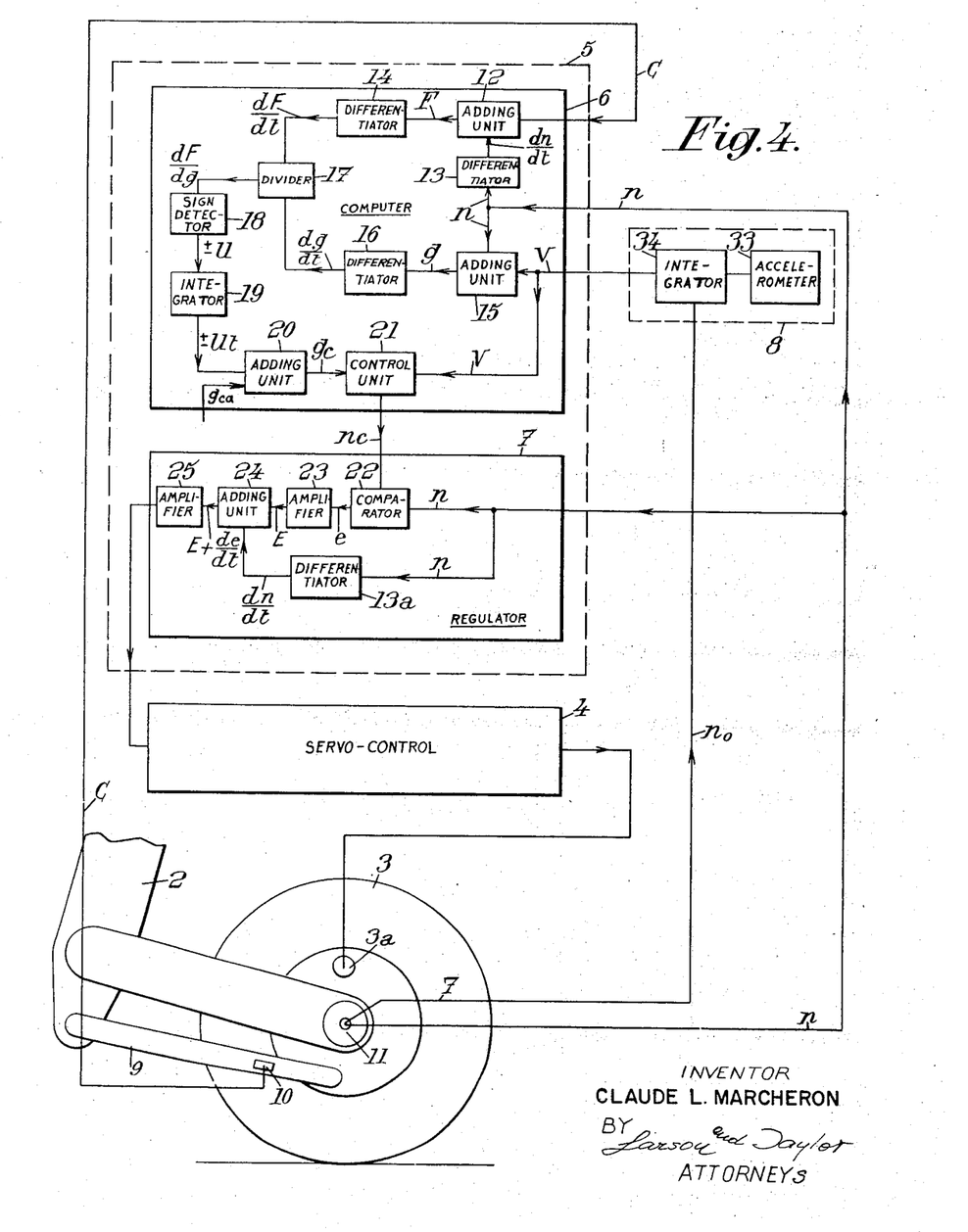
FIGS. 4, 5 and 6 are schematic block diagrams of three embodiments of the control systems used in the system of FIG. 1.

Referring first to computer 6, it is designed and programmed so that, when supplied with input signals containing information indicating the true ground speed V of the aircraft, the braking torque C and the speed of revolution $n$ of the wheel 3 at each instant, it can continuously and regardless of the condition of the landing strip:

(1) First on the basis of the values of C and $n$, calculate the drag force F exerted on wheel 3;

(2) Then on the basis of the values of V and $n$, calculate the value of the slippage $g$ of wheel 3;

(3) Then, using the values obtained above, determine the respective signs of $dg/dt$ and $dF/dt$;

(4) Then compare the signs of these two derivatives and generate a binary signal characteristic of this comparison, the duration of this signal being dependent on the persistance of the variations in the data originally introduced into the computer; and (5) Finally, on the basis of the nature and duration of said binary signal, develop, in a continuously variable manner, a signal representing the assigned slippage $g_c$, which quantity represents a slippage value which is best adapted to the conditions existing at the moment under consideration, this assigned slippage $g_c$ corresponding to an assigned angular wheel velocity $n_c$.

Referring now to regulator 7, it may first be noted that it is connected to receive at least two input signals one of which represents the assigned wheel speed $n_c$ and the other of which represents the instantaneous wheel speed $n$. The regulator is arranged so as to control braking servo-control 4 in such a way as to cause the instantaneous value of $n$ for wheel 3 to be maintained as close as possible to the value of $n_c$ developed by computer 6.

To these ends, and as shown in the embodiment of the electronic system shown in FIG. 4, the computer 6 is fed with three electrical signals the respective values of which represent V, C and $n$.

The signal relating to the true ground speed V could be obtained either from a speed indicating instrument 8 mounted in the aircraft (as indicated in FIGS. 1 and 4) or from an apparatus on the ground (e.g. ground control radar) which transmits a signal indicative of the instantaneous value of the speed V of the aircraft.

With regard to braking torque C exerted on wheel 3, this quantity could advantageously be measured by incorporating brake 3a into a dynamometer arrangement carried by landing gear 2. Such an arrangement may, as shown in FIG. 4, be provided by harnassing brake 3a to gear 2 through a retaining bar 9. The strains experienced by said bar will then be a function of the braking torque C and they can be measured by a strain gauge 10 which would thus directly furnish an electrical signal indicative of the value of torque C.

According to a non-illustrated modification of the above-described torque measuring means, bar 9 could be replaced by a hydraulic jack equipped with a suitably calibrated manometric measuring instrument capable of responding to changes in the pressure of the fluid contained in said jack, these changes being proportional to the braking torque.

However, in certain cases the presence of a bar 9 or of a hydraulic jack would create problems. In such cases there could advantageously be provided a torque measuring unit comprising a manometric unit mounted in the hydraulic circuit controlling brakes 3a. As a matter of fact, supposing the braking effectiveness to remain constant, the variations in the hydraulic braking pressure can be considered as being substantially proportional to the variations in the braking torque C.

Turning now to the determination of the angular wheel velocity $n$, it can easily be measured, as is shown in FIG. 4, by means of an axially mounted tachometer 11 driven by wheel 3, or by means of a counting system utilizing magnetic contacts or photoelectric cells.

*Detailed operation of computer 6*

The computer shown in FIG. 4 represents one form which this unit may take, and comprises:

An adding unit 12 receiving signal C and a signal $dn/dt$ representing the instantaneous time derivative of wheel velocity $n$, this derivative having been produced by a differentiating unit 13 receiving, at its input, the signal representing $n$, said adding unit 12 being arranged so as to produce, at its output a signal characteristic of the drag force F applied to wheel 3 and which is equal to $$F = \frac{I}{R}\left(C - I\frac{dn}{dt}\right)$$

wherein I represent the moment of inertia of wheel 3 about its axis, both I and R being constant and depending on the nature of wheel 3;

A differentiating unit 14 receiving signal F and producing a signal proportional to $dF/dt$;

An adding unit 15 receiving the signals V and $n$ and developing a signal proportional to the slippage $g$ according to the formula:

$$g = \frac{V - nR}{V}$$

A differentiating unit 16 receiving signal $g$ and delivering a signal $dg/dt$;

A divider circuit 17 into which signals $dF/dt$ and $dg/dt$ are introduced and which produces an output signal proportional to $dF/dg$;

A sign detecting unit 18 receiving the signal representing $dF/dg$, detecting its sign, and producing, at its output, a binary signal equal either to $+U$ or $-U$, depending on the sign of $dF/dg$;

An integrating unit 19 receiving a binary signal produced by unit 18 and delivering a binary signal of variable duration $\pm U_t$ proportional to assigned slippage.

Thus, both the sign and the duration of the $U_t$ are important in determining the computed value of $g_c$ and $n_c$. It would be possible to consider $\pm U_t$ as the assigned slippage and to combine the same with V to arrive at $n_c$. However, for greater accuracy it has been found desirable to measure $\pm U_t$ with reference to a constant quantity rather than 0. For this purpose, $U_t$ is added to a constant slippage signal, shown in FIGURE 4 as $g_{ca}$, at adding unit 20. $U_t + g_{ca}$ is then shown as the optimum assigned slippage signal $g_c$.

A final control unit 21 receiving the signals representing $g_c$ and V and delivering at its output a signal representing the optimum, or "assigned" angular wheel velocity $n_c$.

Referring now to regulator 7, one form of which is shown in FIG. 4, this system comprises:

A comparator unit 22 which receives, on the one hand, the signal $n_c$ developed in computer 6 and, on the other hand, the signal $n$ produced by tachometer 11 and produces an error signal $e = n - n_c$ representing the difference between the two input signals;

An amplifier 23 connected to comparator 22 to amplify signal $e$ into a signal E;

An adding unit 24 into which are introduced the amplified signal E and a signal proportional to $dn/dt$ (which is equal to $$\frac{d(e + n_c)}{dt}$$

and therefore to $de/dt + dn_c/dt$ produced by a differentiat- unit 13a (unit 13a could exist as a separate unit in regulator 7 or its function could be fulfilled by the unit 13 of computer 6), which signal $dn/dt$ is due to the fact that $dn_c/dt$ is very small with respect to $dn/dt$, equivalent to $de/dt$, so that adding unit 24 may be considered as receiving input signals representing E and $de/dt$ and delivering at its output, a signal corresponding to $E + de/dt$; and An amplifier unit 25 which is connected to amplify the $E + de/dt$ signal and which has its output connected to the braking servo-control 4 controlling the operation of brakes 3a in such a way as to cause the angular rate of rotation $n$ of wheel 3 to approach the assigned value $n_c$.

The regulator 7 operates in such a way as to cause the circuits 22–25 to make the speed of rotation $n$ dependent on the assigned rotating speed $n_c$ given by computer 6. The circuit made up of units 13a–24–25 functions to increase the speed of response of the first mentioned circuit by adding to the amplified error signal $e$, its time derivative $de/dt$, so that one obtains a balanced average output which takes into account variations in the error signal $e$.

Figure 5:
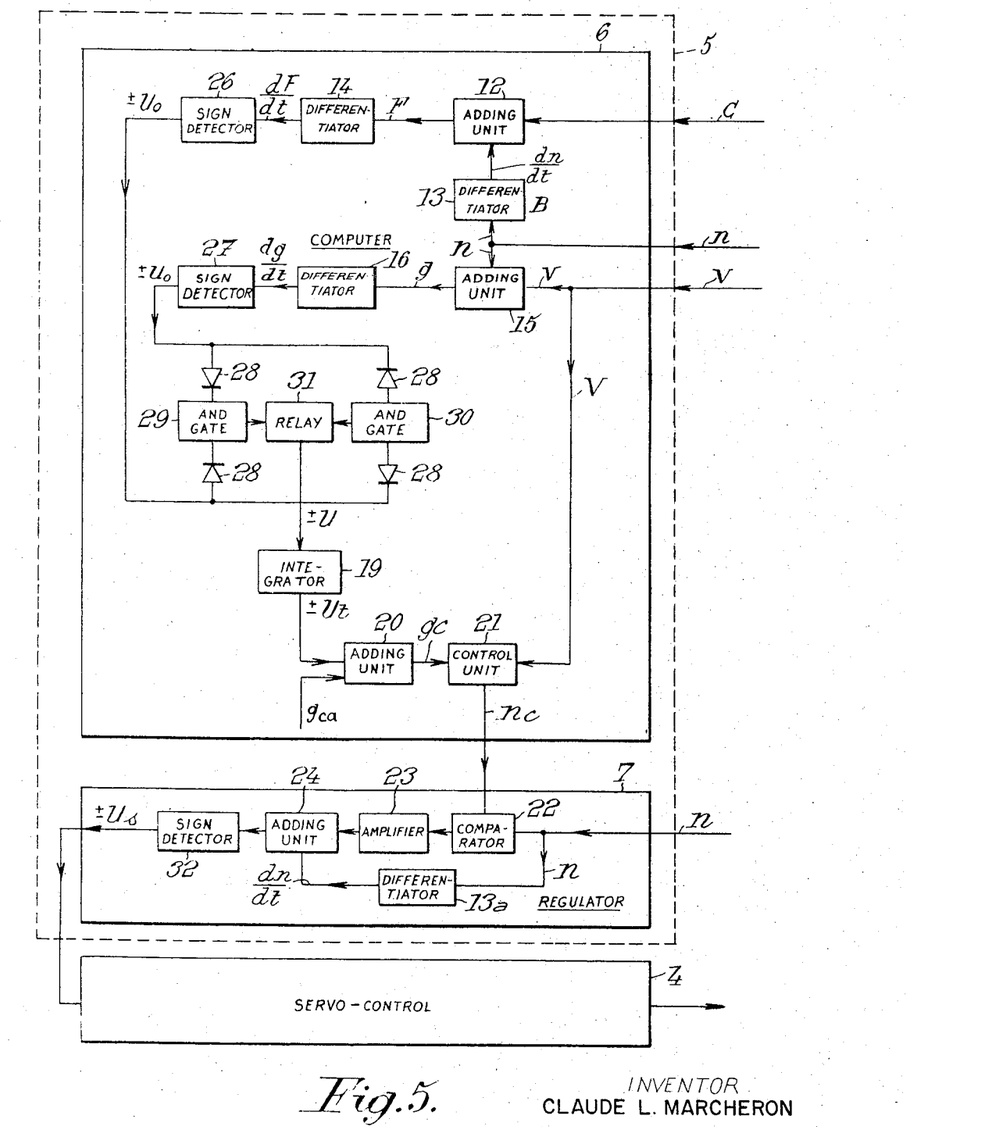
Figure 6:
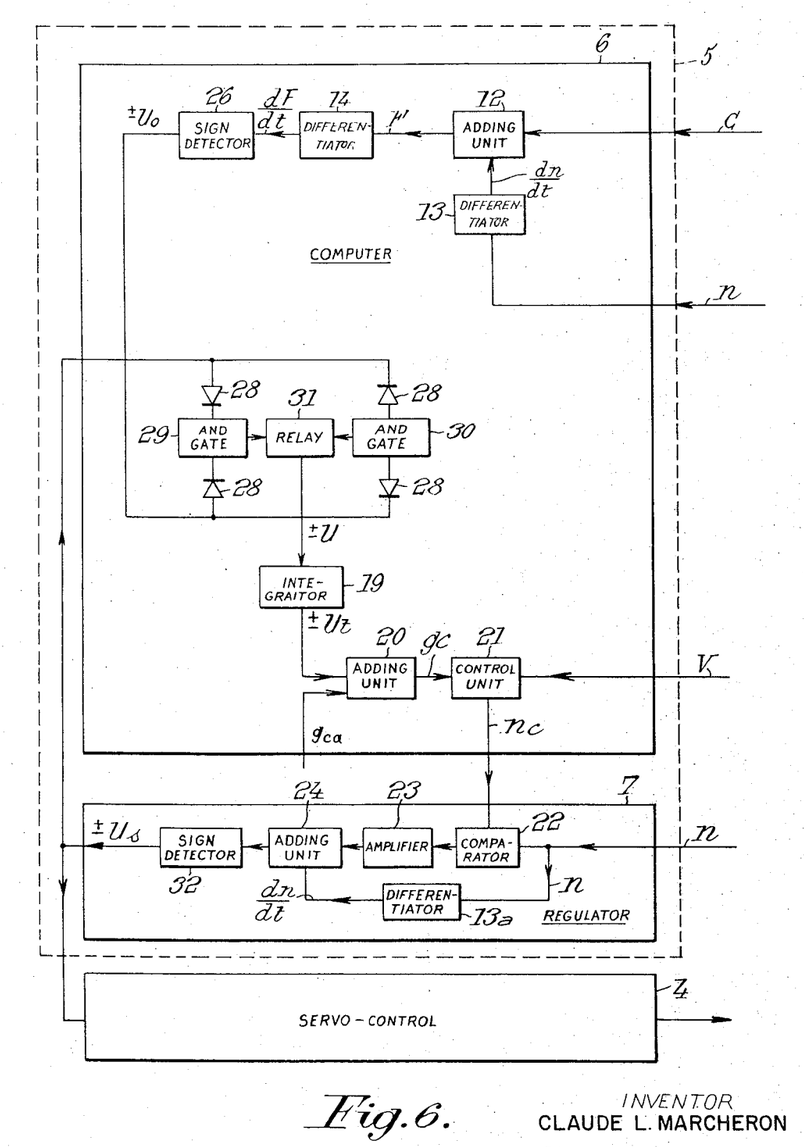

It should be noted that the various portions of the electrical system 5 can be arranged in ways different from that shown in FIG. 4 and may, in particular, be arranged in the modified ways shown in FIGS. 5 and 6, in which figures the same reference numbers represent the same units as those of FIG. 4.

According to the modification shown in FIG. 5, there is provided, at the output of the differentiating unit 14 providing an output proportional to $dF/dt$, a first sign detector 26 and, at the output of the differentiating unit 16 providing an output proportional to $dg/dt$, a second sign detector 27, said sign detectors 26 and 27 each delivering a voltage of amplitude $\pm U_0$ the sign of which depends on the sign respectively, of $dF/dt$ and $dg/dt$.

These voltages $\pm U_0$ are then applied, through diodes 28 to two AND gates 29 and 30, the arrangement of said diodes 28 being such that, if $dF/dt$ and $dg/dt$ are both of the same sign, one of the circuits 29 and 30 will be rendered conductive and will supply a certain current while, if $dF/dt$ and $dg/dt$ are of opposed signs, neither of the AND gates 29 and 30 is fed with current.

The outputs of AND gates 29 and 30 are both delivered to an electronic relay 31 which in turn delivers a binary signal of amplitude U and the sign of which depends on whether or not one of the AND gates is fed with (and delivering) current; i.e. according to the respective signs of $dF/dt$ and $dg/dt$.

The binary signal is then integrated with respect to time in an integrating unit 19 which delivers a binary signal $\pm U_t$ having a variable duration. For greater accuracy this signal may be added in adding unit 20, to a constant slippage signal $g_{ca}$ as explained above with respect to FIGURE 4 to produce a resultant signal representing the instantaneous assigned slippage $g_c$. This signal is employed by the final control unit 21 to produce a signal proportional to the assigned angular wheel speed $n_c$.

The modified regulator 7 of FIG. 5, into which is introduced the above mentioned $n_c$ signal, as well as the signal $n$ representing the instantaneous angular wheel velocity, is identical with the regulator of FIG. 4, with the exception that, in FIG. 5, a different type of output signal is delivered. For this purpose the linear output amplifier 25 of FIG. 4 is replaced by a sign detector 32 which will deliver a voltage $+U_s$ if error $e$ is positive and a voltage $-U_s$ if error $e$ is negative.

It may thus be noted that when $g$ tends to increase, the servo-control 4 exerts a weaker braking force on brakes $3a$ while if $g$ drops below $g_c$ the servo-control receives a signal which causes it to increase the braking force on brakes $3a$.

The second modification of the electronic assembly 5 represents a considerable simplification of the preceding one. As a matter of fact, in most situations, and above all if one considers sufficiently short time intervals, when regulator 7 delivers a voltage $+U_s$ (representing an increase in the braking) the instantaneous slippage $g$ tends to increase and $dg/dt$ is positive, whereas when regulator 7 delivers a voltage $-U_s$ (decrease in the braking force) the instantaneous slippage $g$ tends to decrease and $dg/dt$ is negative. Thus, it is possible to dispense with a direct determination of the sign of $dg/dt$ and the knowledge of the sign of this quantity can be determined from the nature of the output of regulator 7, It is therefore possible, as shown in FIG. 6, to eliminate units 15, 16 and 27 (of FIG. 5) and to apply the output from regulator 7, through diodes 28 (suitably arranged), to one input of each of the AND gates 29 and 30.

With this arrangement it may happen that the initial hypothesis is not complied with during a very short portion of one of the braking phases, but, taking into account the speed of response of assembly 5, the harmful effect of such an occurrence will be negligible. This is due to the fact that the deviation is immediately detected by computer 6 then cancelled the next instant by regulator 7.

Returning now to the means 8 (FIGS. 1 and 4) for measuring the aircraft true ground speed V, it may be noted that this function may be performed by any number of well-known means, such as a Doppler radar or a tachometer attached to a non-braked wheel. However, it seems preferable to employ an arrangement which represents a complementary feature of this invention, and which can be utilized independently of the principal structure of this invention. This measuring means may be used in any device requiring a signal proportional to the velocity V.

The above described means, as shown in the block 8 of FIG. 4, comprises:

An accelerometer 33, advantageously of the inertia type, mounted in aircraft 1 and arranged to measure the longitudinal accelerations $dV/dt$; and An integrating unit 34 receiving the output of unit 33 and a reference signal $n_0$ characteristic of the velocity $V_0$ of the aircraft prior to the application of any braking force, this signal $n_0$ being advantageously delivered from the tachometer 11 which was described above.

The instantaneous velocity V of the aircraft can be represented by the expression:

$$V = V_0 - \int_0^t \frac{dV}{dt} dt$$

or $$V = n_0 R - \int_0^t dV$$

Figure 7:
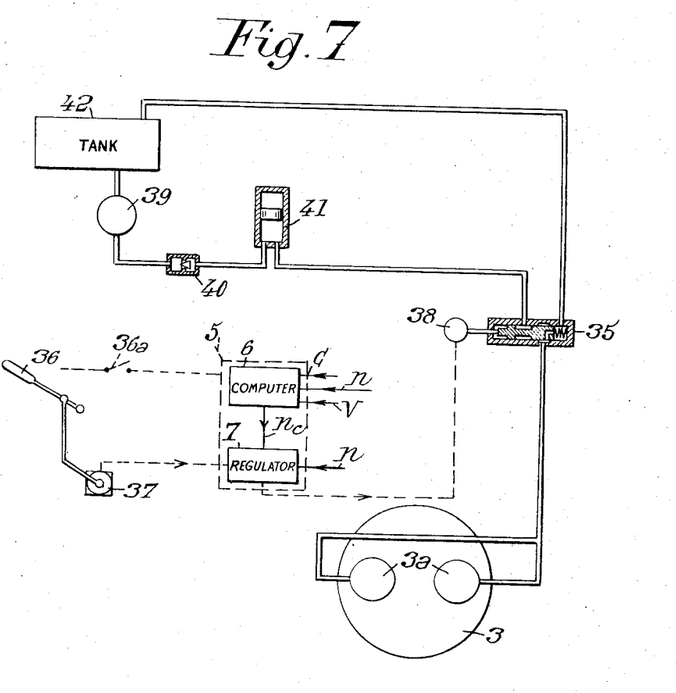
FIG. 7 is a schematic diagram of the hydraulic system of the FIG. 1 device.

Turning now to FIG. 7 there is shown, in a detailed manner, one possible form of the hydraulic system constituting the servo-control 4 permitting the actuation of the brake $3a$ through the intermediary of a servo-valve 35 controlled by regulator 7.

According to the arrangement shown, the manual braking control operative by the pilot, for example a pedal 36, is operatively connected with an electrical transmitter 37 delivering to regulator 7 a signal of an intensity variable with the magnitude of travel of pedal 36. Due to this arrangement, the intensity of the signal sent by regulator 7 to the driving motor 38 of servo-valve 35, and accordingly the maximum pressure level which said servo-valve 35 can deliver, and in a general manner the braking action, can be controlled by the pilot by a mere depression, applying more or less effort of said pedal 36.

Servo-valve 35 may advantageously be fed by a pump 39 through the intermediary of a one-way valve 40 and a pressure accumulator 41, the return of fluid being provided for by a tank 42.

In the case where the present invention is mounted in a piloted aircraft there is placed at the disposition of the pilot a switch $36a$ mounted in the power circuit of electrical assembly 5. This switch permits the operation of assembly 5 to be turned on or off, thus rendering the automatic braking either operative or non-operative, while the pedal 36 gives the pilot the possibility of limiting the level of the automatic braking.

Thus, the braking may be performed, at the will of the pilot, in one of the three following ways:

When switch $36a$ is closed (automatic braking) and pedal 36 is depressed to the maximum (no limitation of the level of automatic braking), an optimum braking is provided, which assures the stopping of the aircraft in a minimum distance;

When the switch $36a$ is closed (automatic braking) and pedal 36 is only partially depressed (limitation of the automatic braking level), an optimum braking is provided below the braking level fixed by the pilot, the aircraft stopping distance being obviously greater than in the preceding case, such an arrangement enabling the pilot to stop at any desired point on the landing strip; or When switch $36a$ is open (automatic braking inoperative), the braking level is only dependent on the position of pedal 36 (ordinary manually controlled braking).

Moreover, the pilot generally also has at his disposal an emergency brake system which could use certain elements of the above-described device.

The present invention may also be used in a pilotless aircraft, in which case the closing of switch $36a$, and if desired the operation of pedal 36, would be effected by remote control.

Two other embodiments of the invention relating to particularly simple constructions of computer 6 will now be described.

Figure 8:
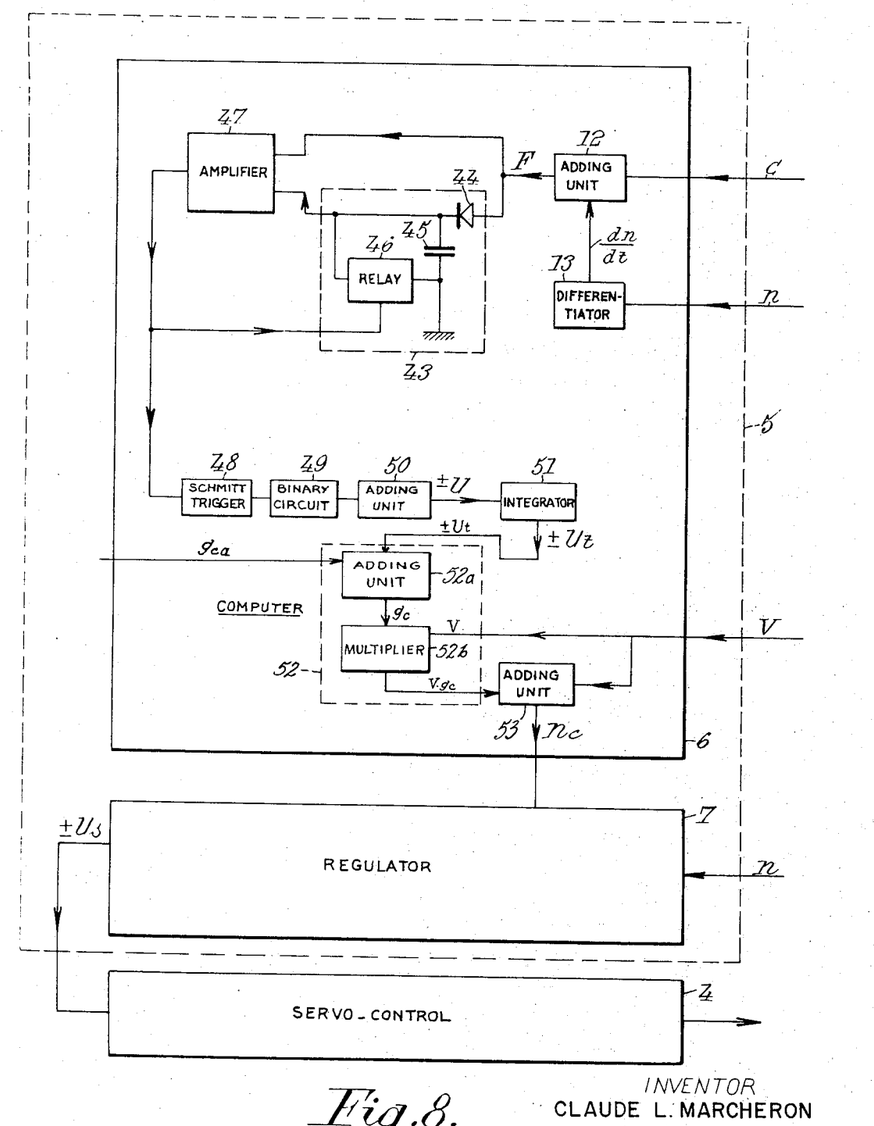
FIGS. 8 and 9 are diagrammatical views illustrating two different embodiments of a portion of a braking system according to the present invention.

In the first of these embodiments, the drag force F exerted on wheel 3 (and calculated from the braking torque C exerted on the wheel and from the angularly velocity $n$ of said wheel) is sent to a circuit operating as a detector of maximums.

For this purpose, and as shown by FIG. 8, computer 6 comprises, as in the above embodiment, adding unit 12 which receives signal C and signal $dn/dt$ (produced from the signal $n$ in differentiating unit 13).

The characteristic signal of drag force F is then sent:

On the one hand to a detector circuit 43 comprising a diode 44, a capacitor 45 and a relay 46 capable of discharging, when it is energized, capacitor 45;

And on the other hand to a differential amplifier 47 which also receives the discharge current of the capacitor 45 of detector circuit 43.

The output of differential amplifier 47 is then connected:

On the one hand to relay 46;

And on the other hand to chain comprising in series a Schmitt trigger circuit 48, a binary circuit 49 and an adding unit 50 delivering a binary signal $\pm U$.

This binary signal $\pm U$ is integrated in an integrating unit 51 which therefore delivers the binary signal $\pm U_t$ of variable duration.

Signal $\pm U_t$ is transformed in a control unit 52 which also receives the signal V characteristic of the velocity of the aircraft, said control unit then delivering signal $V.g_c$ defined by the following relation $$V.g_c = V - R.n_c$$

R being the radius of wheel 3.

As in the embodiment of FIGURES 4–6 a constant slippage signal $g_{ca}$ is combined with the signal $\pm U_t$ in adding unit 52a producing an output signal $g_c$ proportional to the assigned slippage. $g_c$ is then combined with signal V in a multiplier 52b delivering a signal proportional to $V.g_c$.

Finally, an adding unit 53, receiving signals $V.g_c$ and V, delivers signal $n_c$.

It should be noted, concerning the computer of this type, that the capacitor 45 of the detector circuit 43 is charged only by a very high impedance. It may therefore be admitted that within a very short time period it can only be charged, discharge taking place merely through the intermediate of relay 46, when this relay is energized.

Figure 10:
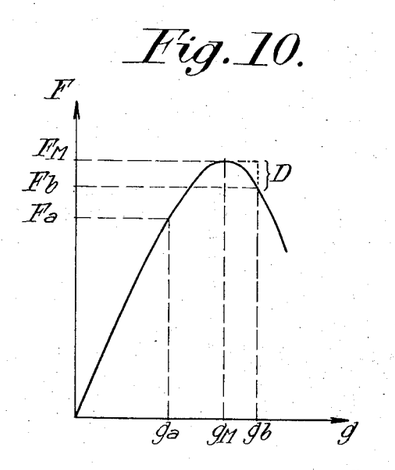
FIG. 10 is an explanatory diagram.

The operation of the regulator is illustrated by the diagram of FIG. 10, wherein the abscissas represents the instantaneous slippage $g$ of the wheel and the ordinates represent the drag force F exerted on said wheel.

As a matter of fact, if the drag force F, which is a function of the instantaneous slippage $g$, varies from a value $F_a$ to a value $F_b$ when $g$ passes from $g_a$ to $g_b$, the function $F(g)$ passes through a maximum value $F_M$ corresponding to a value $g_M$ of the slippage.

The operation of capacitor 45 being as above described, the electric voltage across the terminals of the capacitor therefore follows the increasing variation of F (from $F_a$ to $F_b$ for instance). But as soon as the value of $g_M$ exceeds the value of the assigned slippage $g_c$, which involves a decrease of F, the signal across the terminals of capacitor 45 remains constant (horizontal portion in dot-and-dash lines of the curve of FIG. 10).

Comparison between, on the one hand, the signal across the terminals of capacitor 45 and, on the other hand, the instantaneous value of F permits of detecting the passage through a maximum value $F_M$. If D represents the trigger threshold of the system, every time $F_M - F = D$, relay 46 is energized and causes a discharge of capacitor 45, which permits a new determination of the maximum value of F.

Then the signal delivered by differential amplifier 47 operates a chain of logical circuits comprising a monostable multivibrator of the Schmitt trigger circuit type 48 and a binary circuit 49 which enables the integrating circuit to operate either in one direction ($+U_t$) or in the other ($-U_t$).

Figure 9:
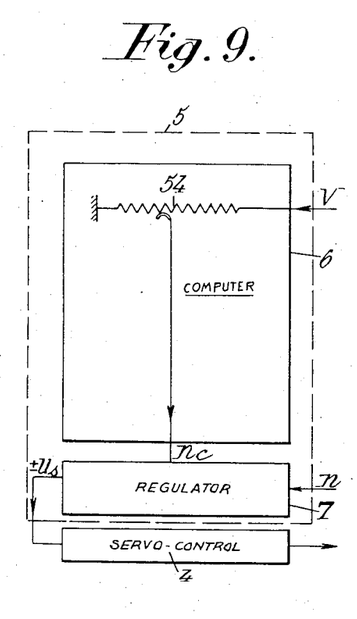

In the other of the two above mentioned simplified embodiments, computer 6 produces a signal representative of a predetermined value of the assigned slippage $g_c$ (for instance determined experimentally).

Computer 6 then includes, as shown by FIG. 9, a potentiometer 54 receiving the signal V characteristic of the velocity of the aircraft and delivering the signal characteristic of the assigned angular velocity $n_c$, such as $$n_c = \frac{V}{R}(1 - g_c)$$

R being the radius of wheel 3.

The output signal $n_c$ of computer 6 made according to one of the two last described embodiments is then fed to regulator 7, which is for instance identical to those above described.

Figure 11:
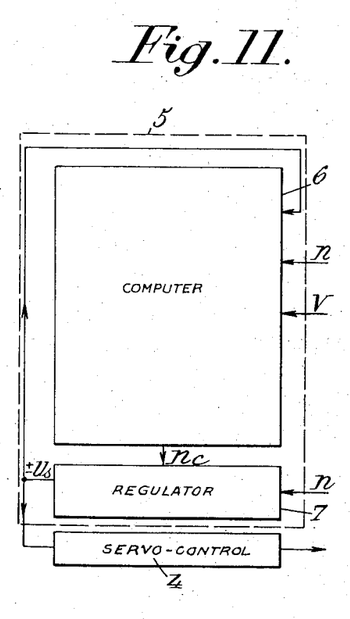
FIG. 11 is a diagrammatical view of a modification of the braking system according to the present invention.

Finally FIG. 11 shows a braking system particularly interesting when the hydraulic braking circuit servo-control 4 includes a pressure operated servo-valve. In this case it may be considered that the transfer function of said servo-valve is constant within a very short time interval. It is then possible to dispense with the measurement of the torque C exerted on wheel 3 since this torque C is proportional to the signal $\pm U_s$ delivered by regulator 7.

Computer 6 then receives, as shown by FIG. 11, in addition to the signals representative of the instantaneous angular speed $n$ of the wheel and of the velocity V of the aircraft, the signal $\pm U_s$ delivered by regulator 7.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. In an automatic braking system for a vehicle comprising at least one wheel equipped with a brake and servo-control means for actuating said brake to produce a braking torque, a device for optimally controlling the braking of said wheel, said device comprising, in combination:

first detecting means for producing a signal proportional to the ground speed of said vehicle;
   second detecting means for producing a signal proportional to the instantaneous angular velocity of said wheel;
   third detecting means for producing a signal variable in relation to said braking torque;
   a computer receiving said three above mentioned signals and producing a signal representative of the wheel angular velocity value which will yield the maximum drag force between the ground and the wheel; and
   regulator means receiving said signal produced by said second detecting means and said signal produced by said computer, and connected to transmit a control signal to said brake actuating means, said last mentioned control signal being dependent on the amplitude and sign of the difference between said signals received from said second detecting means and from said computer, respectively.

2. A system according to claim 1 wherein said vehicle is an aircraft and said third detecting means consist of dynamometer means carried by the landing gear of said aircraft.

3. A system according to claim 1 wherein said vehicle is an aircraft, having a landing gear and a wheel brake, and said third detecting means comprise a rigid compression strut mounted between said landing gear and said wheel brake so as to be subject to strains proportional to the braking torque and an extensometer gage mounted on said strut for producing an electrical signal proportional to the strain experienced by the latter.

4. A system according to claim 1 wherein said second detecting means comprise a tachometer generator driven by said wheel.

5. In an automatic braking system for a vehicle comprising at least one wheel equipped with a brake and servo-control means for actuating said brake to produce a braking torque, a device for optimally controlling the braking of said wheel, said device comprising, in combination:

three detecting means indicative of significative data, to wit:

first detecting means for producing at its output a signal proportional to the ground speed of said vehicle;

second detecting means for producing at its output a signal proportional to the instantaneous angular velocity of said wheel; and third detecting means for producing at its output a signal variable in relation to said braking torque;

an electronic computer comprising:

a first time differentiating unit having one input, connected to said second detecting means output, and one output, whereby the signal delivered at said last mentioned output is indicative of the time derivative of the instantaneous angular velocity of said wheel, a first adding unit having two inputs and one output, said two last mentioned inputs being connected, respectively, to said third detecting means output and to the first of said differentiating unit outputs, whereby the signal delivered at said adding unit output is indicative of said wheel drag force, a second time differentiating unit having one input, connected to the output of said first adding unit, and one output, whereby the signal delivered at said last mentioned output is indicative of the time derivative of said wheel drag force, a device having one input connected with said second time differentiating unit output, and another input connected with said first and second detecting means, said device having an output delivering a signal, a sign detecting unit having one input indicative of the sign of the derivative of the drag force with respect to the slippage, an integrating unit having one input, connected to the output of said device, and one output, whereby the signal delivered at said last mentionel output is indicative of the persistence of the data supplied to the computer, a second adding unit having one input, connected to the output of said integrating unit, and one output, whereby the signal delivered at said last mentioned output is indicative of the assigned slippage of the wheel, and a final control unit having two inputs and one output, said two last mentioned inputs being connected, respectively, to the output of said second adding unit and to the output of said first detecting means, said final control unit output being the output of said computer and delivering a signal representative of the assigned wheel angular velocity value, which will yield the maximum drag force between the ground and the wheel; and a regulator comprising:

a comparator unit having two inputs and one output, said two last mentioned inputs being connected, respectively, to the output of said second detecting means and to the output of said computer, whereby the signal delivered at said comparator unit output is indicative of the difference between the two input signals supplied to said comparator unit, an amplifier having one input connected to the output of said comparator unit, and one output, a time differentiating unit having one input, connected to the output of said second detecting means, and one output, whereby the signal delivered at said last mentioned output is indicative of the time derivative of the angular velocity of said wheel, an adding unit having two inputs and one output, said two last mentioned inputs being connected respectively to the output of said amplifier and to the output of said last mentioned differentiating unit, and means, forming the output means of said regulator for operating said brake actuating servo-control means in response to the output signal of said last mentioned adding unit.

6. In an automatic braking system for a vehicle comprising at least one wheel equipped with a brake and servo-control means for actuating said brake to produce a braking torque, a device for optimally controlling the braking of said wheel, said device comprising, in combination:

three detecting means indicative of significative data, to wit:

first detecting means for producing at its output a signal proportional to the ground speed of said vehicle;

second detecting means for producing at its output a signal proportional to the instantaneous angular velocity of said wheel; and third detecting means for producing at its output a signal variable in relation to said braking torque;

an electronic computer comprising:

a first time differentiating unit having one input, connected to said second detecting means output, and one output, whereby the signal delivered at said last mentioned output is indicative of the time derivative of the instantaneous angular velocity of said wheel, a first adding unit having two inputs and one output, said two last mentioned inputs being connected, respectively, to said third detecting means output and to said first differentiating unit outputs, whereby the signal delivered at said first adding unit output is indicative of said wheel drag force, a second time differentiating unit having one input, connected to the output of said first adding unit, and one output, whereby the signal delivered at said last mentioned output is indicative of the time derivative of said wheel drag force, a second adding unit having two inputs and one output, said two last mentioned inputs being connected respectively to said first detecting means output and to said second detecting means output, whereby the signal delivered at said last mentioned adding unit output is indicative of the actual slippage of said wheel, a third time differentiating unit having one input, connected to the output of said second adding unit, and one output, whereby the signal delivered at said last mentioned output is indicative of the time derivative of said slippage, a divider circuit having two inputs and one output, said two last mentioned inputs being connected, respectively, to the outputs of said second and third differentiating units, whereby the signal delivered at said divider circuit output is indicative of the derivative of said drag force with respect to said slippage, a sign detecting unit having one input connected to the output of said divider circuit and one output whereby the signal delivered at said last mentioned output is indicative of the sign of said derivative of the drag force with respect to the slippage, an integrating unit having one input, connected to the output of said sign detecting unit, and one output, whereby the signal delivered at said last mentioned output is indicative of the persistence of the data supplied to the computer, a third adding unit having one input, connected to the output of said integrating unit, and one output, whereby the signal delivered at said last mentioned output is indicative of the assigned slippage of the wheel, and a final control unit having two inputs and one output, said two last mentioned inputs being connected, respectively, to the output of said third adding unit and to the output of said first detecting means, said final control unit output being the output of said computer and delivering a signal representative of the assigned wheel angular velocity value, which will yield the maximum drag force between the ground and the wheel; and a regulator comprising:

a comparator unit having two inputs and one output, said two last mentioned inputs being connected, respectively, to the output of said second detecting means and to the output of said computer, whereby the signal delivered at said comparator unit output is indicative of the difference between the two input signals supplied to said comparator unit, an amplifier having one input connected to the output of said comparator unit, and one output, a time differentiating unit having one input, connected to the output of said second detecting means, and one output, whereby the signal delivered at said last mentioned output is indicative of the time derivative of the angular velocity of said wheel, an adding unit having two inputs and one output, said two last mentioned inputs being connected respectively to the output of said amplifier and to the output of said last mentioned differentiating unit, and means, forming the output means of said regulator, for operating said brake actuating servo-control means in response to the output signal of said last mentioned adding unit.

7. In an automatic braking system for a vehicle comprising at least one wheel equipped with a brake and servo-control means for actuating said brake to produce a braking torque, a device for optimally controlling the braking of said wheel, said device comprising, in combination:

three detecting means indicative of significative data, to wit:

first detecting means for producing at its output a signal proportional to the ground speed of said vehicle;

second detecting means for producing at its output a signal proportional to the instantaneous angular velocity of said wheel; and third detecting means for producing at its output a signal variable in relation to said braking torque;

an electronic computer comprising:

a first time differentiating unit having one input, connected to said second detecting means output, and one output, whereby the signal delivered at said last mentioned output is indicative of the time derivative of the instantaneous angular velocity of said wheel, a first adding unit having two inputs and one output, said two last mentioned inputs being connected, respectively, to said third detecting means output and to said first differentiating unit output, whereby the signal delivered at said first adding unit output is indicative of said wheel drag force, a second time differentiating unit having one input, connected to the output of said first adding unit, and one output, whereby the signal delivered at said last mentioned output is indicative of the time derivative of said wheel drag force, a second adding unit having two inputs and one output, said two last mentioned inputs being connected respectively to said first detecting means output and to said second detecting means output, whereby the signal delivered at said last mentioned adding unit output is indicative of the actual slippage of said wheel, a third time differentiating unit having one input, connected to the output of said second adding unit, and one output, whereby the signal delivered at said last mentioned output is indicative of the time derivative of said slippage, a first sign detecting unit having one input, connected to the output of said second differentiating unit, and one output, whereby the signal delivered at said last mentioned output is indicative of the sign of the derivative supplied at the output of said second differentiating unit, a second sign detecting unit having one input, connected to the output of said third differentiating unit, and one output, whereby the signal delivered at said last mentioned output is indicative of the sign of the derivative supplied at the output of said third differentiating unit, two AND gates having each two input terminals and one output, a first pair of diodes in opposition to each other connected to the input terminals of one of said AND gates, a second pair of diodes in opposition to each other connected to the input terminals of the other of said AND gates, the output of said first sign detecting unit being connected to both one diode of the first pair and one diode of the second pair, said two last mentioned diodes being mounted in opposed relations with respect to the respective AND gates with which they are connected, the output of said second sign detecting unit being connected to both the other diode of the first pair and the other diode of the second pair, an electronic relay having two inputs and one output, said two last mentioned inputs being connected to said outputs of said AND gates, respectively, whereby said electronic relay is, or is not, fed with current according as the respective outputs of said first and second sign detecting units are both of the same sign, or are of opposed sign, respectively, an integrating unit having one input, connected to the output of said electronic relay, and one output, whereby the signal delivered at said last mentioned output is indicative of the persistence of the data supplied to the computer, a third adding unit having one input, connected to the output of said integrating unit, and one output, whereby the signal delivered at said last mentioned output is indicative of the assigned slippage of the wheel, and a final control unit having two inputs and one output, said two last mentioned inputs being connected, respectively, to the output of said third adding unit and to the output of said first detecting means, said final control unit output being the output of said computer and delivering a signal representative of the assigned wheel angular velocity value, which will yield the maximum drag force between the ground and the wheel; and a regulator comprising:
- a comparator unit having two inputs and one output, said two last mentioned inputs being connected, respectively, to the output of said second detecting means and to the output of said computer, whereby the signal delivered at said comparator unit output is indicative of the difference between the two input signals supplied to said comparator unit,
- an amplifier having one input connected to the output of said comparator unit, and one output,
- a time differentiating unit having one input, connected to the output of said second detecting means, and one output, whereby the signal delivered at said last mentioned output is indicative of the time derivative of the angular velocity of said wheel,
- an adding unit having two inputs and one output, said two last mentioned inputs being connected respectively to the output of said amplifier and to the output of said last mentioned differentiating unit, and
- a sign detecting unit having one input, connected to the output of said last mentioned adding unit, and one output, forming the output of said regulator, for delivering a binary signal the sign of which is the sign of the difference between the two signals which represent, respectively, the instantaneous wheel angular velocity and the assigned wheel angular velocity, said last mentioned binary signal serving to control said brake actuating servo-control means.

8. In an automatic braking system for a vehicle comprising at least one wheel equipped with a brake and servo-control means for actuating said brake to produce a braking torque, a device for optimally controlling the braking of said wheel, said device comprising, in combination:

three detecting means indicative of significative data, to wit:
- first detecting means for producing at its output a signal proportional to the ground speed of said vehicle;
- second detecting means for producing at its output a signal proportional to the instantaneous angular velocity of said wheel; and
- third detecting means for producing at its output a signal variable in relation to said braking torque;

an electronic computer receiving the signals of the three above mentioned detecting means and delivering a signal at its output, and a regulator having two inputs and one output, said two last mentioned inputs being connected respectively to the output of said second detecting means and to the output of said computer, and delivering at its output a binary signal serving to control said brake actuating servo-control means, said electronic computer comprising:
- a first time differentiating unit having one input, connected to said second detecting means output, and one output, whereby the signal delivered at said last mentioned output is indicative of the time derivative of the instantaneous angular velocity of said wheel,
- a first adding unit having two inputs and one output, said two last mentioned inputs being connected, respectively, to said third detecting means output and to said first differentiating unit output, whereby the signal delivered at said adding unit output is indicative of said wheel drag force,
- a second time differentiating unit having one input, connected to the output of said first adding unit, and one output, whereby the signal delivered at said last mentioned output is indicative of the time derivative of said wheel drag force,
- a sign detecting unit having one input, connected to the output of said second differentiating unit, and one output, whereby the signal delivered at said last mentioned output is indicative of the sign of the derivative supplied at the output of said second differentiating unit,
- two AND gates having each two input terminals and one output,
- a first pair of diodes in opposition to each other connected to the input terminals of one of said AND gates,
- a second pair of diodes in opposition to each other connected to the input terminals of the other of said AND gates,
- the output of said sign detecting unit being connected to both one diode of the first pair and one diode of the second pair, said two last mentioned diodes being mounted in opposed relations with respect to the respective AND gates with which they are connected,
- the output of said regulator being connected to both the other diode of the first pair and to the other diode of the second pair,
- an electronic relay having two inputs and one output, said two last mentioned inputs being connected to said outputs of said AND gates, respectively, whereby said electronic relay is, or is not, fed with current according as the respective outputs of said sign detecting unit and of said regulator are both of the same sign, or are of opposed sign, respectively,
- an integrating unit having one input, connected to the output of said sign electronic relay and one output, whereby the signal delivered at said last mentioned output is indicative of the persistence of the data supplied to the computer,
- a second adding unit having one input, connected to the output of said integrating unit, and one output, whereby the signal delivered at said last mentioned output is indicative of the assigned slippage of the wheel, and
- a final control unit having two inputs and one output, said two last mentioned inputs being connected, respectively, to the output of said last mentioned adding unit and to the output of said first detecting means, said final control unit output being the output of said computer and delivering a signal representative of the wheel angular velocity value which will yield the maximum drag force between the ground and the wheel;

said regulator comprising:
- a comparator unit having two inputs and one output, said two last mentioned inputs being connected, respectively, to the output of said second detecting means and to the output of said computer, whereby the signal delivered at said comparator unit output is indicative of the difference between the two input signals supplied to said comparator unit,
- an amplifier having one input connected to the output of said comparator unit, and one output,
- a time differentiating unit having one input, connected to the output of said second detecting means, and one output, whereby the signal delivered at said last mentioned output is indicative of the time derivative of the angular velocity of said wheel,
- an adding unit having two inputs and one output, said two last mentioned inputs being connected respectively to the output of said amplifier and to the output of said last mentioned differentiating unit, and a sign detecting unit having one input, connected to the output of said last mentioned adding unit, and one output, forming the output of said regulator, for delivering a binary signal the sign of which is the sign of the difference between the two signals which represent, respectively, the instantaneous wheel angular velocity and the assigned wheel angular velocity, said last mentioned binary signal serving to control said brake actuating servo-control means, and means for transmitting said output signal of said last mentioned sign detecting unit to both the other diode of the first pair and the other diode of said second pair.

9. In an automatic braking system for a vehicle comprising at least one wheel equipped with a brake and servo-control means for actuating said brake to produce a braking torque, a device for optimally controlling the braking of said wheel, said device comprising, in combination:

three detecting means indicative of significative data, to wit:

first detecting means for producing at its output a signal proportional to the ground speed of said vehicle;

second detecting means for producing at its output a signal proportional to the instantaneous angular velocity of said wheel; and third detecting means for producing at its output a signal variable in relation to said braking torque;

an electronic computer comprising:

a time differentiating unit having one input, connected to said second detecting means output, and one output, whereby the signal delivered at said last mentioned output is indicative of the time derivative of the instantaneous angular velocity of said wheel;

an adding unit having two inputs and one output, said two last mentioned inputs being connected, respectively, to said third detecting means output and to the first of said differentiating unit outputs, whereby the signal delivered at said adding unit output is indicative of said wheel drag force, a differential amplifier having two inputs, a first one and a second one, and one output, said first last mentioned input being connected to said adding unit output;

a detector circuit including a diode mounted in series between said adding unit output and said differential amplifier second input, the input of said diode being connected to the output of said adding unit, and a conductor forming a part of said detector circuit connecting the output of said diode with said differential amplifier second input;

said detector circuit further comprising a capacitor having one terminal thereof connected to a first point of said conductor and a relay inserted between the other terminal of said capacitor and a second point of said conductor downstream of the first one, said second terminal of said capacitor being earthed;

the output of said differential amplifier being connected to said relay for controlling it;

a chain comprising in series a Schmitt trigger circuit, a binary circuit and an adding circuit, the input of said Schmitt trigger circuit being connected with the output of said differential amplifier, whereby the signal delivered at the output of said last mentioned adding unit is a binary signal;

an integrating unit having one input, connected to the output of said last mentioned adding unit, and one output, whereby the signal delivered at said integrating unit output is a binary signal of variable duration;

a control unit having two inputs and one output, one of said two last mentioned inputs being connected to the output of said integrating unit, the other of said two last mentioned inputs being connected to said first detecting means which produce a signal proportional to the ground speed of the vehicle;

an adding unit having two inputs and one output, one of said two last mentioned inputs being connected to the output of said control unit, the other of said two last mentioned inputs being connected to said first detecting means which produce a signal proportional to the ground speed of the vehicle;

the output of said last mentioned adding unit being the output of said computer and delivering a signal representative of the wheel angular velocity value which will yield the maximum drag force between the ground and the wheel; and a regulator comprising:

a comparator unit having two inputs and one output, said two last mentioned inputs being connected, respectively, to the output of said second detecting means and to the output of said computer, whereby the signal delivered at said comparator unit output is indicative of the difference between the two input signals supplied to said comparator unit;

an amplifier having one input connected to the output of said comparator unit, and one output, a time differentiating unit having one input, connected to the output of said second detecting means, and one output, whereby the signal delivered at said last mentioned output is indicative of the time derivative of the angular velocity of said wheel;

an adding unit having two inputs and one output, said two last mentioned inputs being connected respectively to the output of said amplifier and to the output of said last mentioned differentiating unit; and a sign detecting unit having one input, connected to the output of said last mentioned adding unit, and one output, forming the output of said regulator, for delivering a binary signal the sign of which is the sign of the difference between the two signals which represent, respectively, the instantaneous wheel angular velocity and the assigned wheel angular velocity, said last mentioned binary signal serving to control said brake actuating servo-control means.

10. In an automatic braking system for a vehicle comprising at least one wheel equipped with a brake and servo-control means for actuating said brake to produce a braking torque, a device for optimally controlling the braking of said wheel, said device comprising, in combination:

detecting means for producing a signal proportional to the instantaneous angular velocity of said wheel;

a computer producing a predetermined signal representative of the wheel angular velocity value which will yield the maximum drag force between the ground and the wheel; and regulator means receiving said signal produced by said detecting means and said signal produced by said computer, and connected to transmit a control signal to said brake actuating means, said last mentioned control signal being dependent on the amplitude and sign of the difference between said signals received from said detecting means and from said computer, respectively.

11. In an automatic braking system for a vehicle comprising at least one wheel equipped with a brake and servo-control means for actuating said brake to produce a braking torque, a device for optimally controlling the braking of said wheel, said device comprising, in combination:
   first detecting means for producing a signal proportional to the ground speed of said vehicle;
   second detecting means for producing a signal proportional to the instantaneous angular velocity of said wheel;
   a computer consisting essentially of a potentiometer receiving said first mentioned signal and delivering a predetermined signal representative of the wheel angular velocity value which will yield the maximum drag force between the ground and the wheel; and
   regulator means receiving said signal produced by said second detecting means and said signal produced by said computer, and connected to transmit a control signal to said brake actuating means, said last mentioned control signal being dependent on the amplitude and sign of the difference between said signals received from said second detecting means and from said computer, respectively.

12. In an automatic braking system for a vehicle comprising at least one wheel equipped with a brake and pressure responsive servo-control means for actuating said brake to produce a braking torque, a device for optimally controlling the braking of said wheel, said device comprising, in combination:
   first detecting means for producing a signal proportional to the ground speed of said vehicle;
   second detecting means for producing a signal proportional to the instantaneous angular velocity of said wheel;
   third detecting means for producing a signal variable in relation to said braking torque;
   a computer receiving said three above mentioned signals and producing a signal representative of the wheel angular velocity value which will yield the maximum drag force between the ground and the wheel; and
   a regulator receiving said signal produced by said second detecting means and said signal produced by said computer, and having an output transmitting a control signal to said brake actuating means, said last mentioned control signal being dependent on the amplitude and sign of the difference between said signals received from said second detecting means and from said computer, respectively.
   said third detecting means being constituted by said regulator output.

13. In an automatic braking system for a wheeled aircraft comprising at least one wheel equipped with a brake, means for actuating said brake and means for controlling said actuating means in accordance with certain parameters at least one of which is the aircraft ground speed, a device for determining this ground speed, said device comprising, in combination, an accelerometer mounted on said aircraft for delivering a signal representing the longitudinal acceleration of said aircraft, tachometric means for delivering a signal representing the velocity of said aircraft on landing and integrating means connected to the output of said accelerometer for integrating the signal delivered by it and adding to the result of this integration the signal delivered by said tachometric means.

14. A device as recited in claim 13 wherein said tachometric means consists of a tachometer mounted on said wheel.

15. A system according to claim 1, said computer including a combining means for combining the signals of the second and the third detecting means to provide a signal variable in relation to the actual drag force between the ground and the wheel, a maximum drag force detecting circuit for receiving said actual drag force signal and yielding an output signal indicative of the maximum actual drag force signal received by the said detecting circuit over a preceding period of operation, a differential amplifier for receiving the output of the detecting circuit, and a control circuit for combining the said differential amplifier output signal and the said signal from the first detecting means to yield the said signal representative of the wheel angular velocity value which will yield the maximum drag force between the ground and the wheel.

16. A system according to claim 15 wherein the said third detecting means is constituted by the said regulator output.

17. A system according to claim 16 wherein the said differential amplifier has at least an output and two inputs, the output from the combining means connected to the first differential amplifier input and the output from the detecting circuit connected to the second differential amplifier input.

18. A system according to claim 17 wherein the said detecting circuit includes a diode means having one of its terminals connected to the combining means and having its other terminal connected through a conductor to the second differential amplifier input, a capacitor means connected to said conductor for storing an electrical charge representative of the said maximum drag force signal, and a relay means, connected to the capacitor for discharging the capacitor.

19. A system according to claim 18 wherein the relay means is connected across the said conductor and the said differential amplifier output.

20. A system according to claim 19 wherein the said control circuit includes a chain comprising in series a Schmitt trigger circuit, a binary circuit and an adding circuit, the input of the Schmitt trigger circuit being connected with the output of the differential amplifier, whereby the signal delivered at the output of the last mentioned adding unit is a binary signal.

21. A system according to claim 20 wherein the control circuit further includes an integrating circuit having one input connected to the output of the last said adding unit and one output which is a binary signal of variable duration.

22. A system according to claim 21 wherein the control circuit further includes a control unit having two inputs and one output, one of said two last mentioned inputs being connected to the output of the said integrating unit, the other said two last mentioned inputs being connected to said first detecting means to produce a signal proportional to the actual ground speed of the vehicle.

23. A system according to claim 22 wherein the control circuit further includes another adding unit having two inputs and one output, one said two last mentioned inputs being connected to the output of the said control unit, the other of said two last mentioned inputs being connected to said first detecting means to produce the said signal representative of the wheel angular velocity value which will yield the maximum drag force between the ground and the wheel.

24. A system according to claim 16 wherein the said control circuit includes a chain comprising in series a Schmitt trigger circuit, a binary circuit and an adding circuit, the input of the Schmitt trigger circuit being connected with the output of the differential amplifier, whereby the signal delivered at the output of the last mentioned adding unit is a binary signal.

25. A system according to claim 24 wherein the control circuit further includes an integrating circuit having one input connected to the output of the last said adding unit and one output which is a binary signal of variable duration.

26. A system according to claim 25 wherein the control circuit further includes a control unit having two inputs and one output, one of said two last mentioned inputs being connected to the output of the said integrating unit, the other said two last mentioned inputs being connected to said first detecting means to produce a signal proportional to the actual ground speed of the vehicle.

27. A system according to claim 26 wherein the control circuit further includes another adding unit having two inputs and one output, one of said two last mentioned inputs being connected to the output of the said control unit, the other of said two last mentioned inputs being connected to said first detecting means to produce the said signal representative of the wheel angular velocity value which will yield the maximum drag force between the ground and the wheel.

28. A system according to claim 16 wherein the control circuit includes a chain cooperating with the maximum detecting circuit and comprising, in series, a Schmitt trigger circuit, a binary circuit, an adding unit, an integrator, and a control unit, the control unit receiving a signal from the said first detecting means to produce a signal proportional to the ground speed of the vehicle, and including another adding unit for combining the last said signal with the signal from the first detecting means to yield the said signal representative of the wheel angular velocity value which will yield the maximum drag force between the ground and the wheel.

29. A system according to claim 28 wherein the maximum detecting circuit comprises a diode, a capacitor connected from one of the diode terminals to ground and a relay means capable of discharging the said capacitor when it is excited.

30. A system according to claim 28 wherein the differential amplifier includes two inputs, one connected to the output of the combining means and the other connected to the output of the maximum detecting circuit, and wherein the said relay means is connected between the said second input to the differential amplifier and the said output of the differential amplifier.

References Cited
UNITED STATES PATENTS 3,131,975    5/1964    Smith et al. __________ 303—21

EUGENE G. BOTZ, *Primary Examiner.*